United States Patent [19]

Seneau

[11] Patent Number: 4,788,067
[45] Date of Patent: Nov. 29, 1988

[54] PREPROOFED, FROZEN AND 84% BAKED, CRUSTY BREAD AND METHOD OF MAKING SAME

[75] Inventor: Bernard Seneau, Woodbridge, Conn.
[73] Assignee: General Foods Corporation, White Plains, N.Y.
[21] Appl. No.: 65,821
[22] Filed: Jun. 23, 1987
[51] Int. Cl.$^4$ .................. A21D 6/00; A21D 10/00; A21D 10/02; A21D 13/00
[52] U.S. Cl. ...................... 426/19; 426/496; 426/497; 426/498; 426/511; 426/524
[58] Field of Search .............. 526/497, 498, 496, 511, 526/19, 524

[56] References Cited

U.S. PATENT DOCUMENTS

| | | | |
|---|---|---|---|
| 1,169,023 | 1/1916 | Embrey | 426/496 |
| 1,224,492 | 5/1917 | Narobe | 426/496 |
| 2,204,045 | 6/1940 | Meacham | 426/496 |
| 2,549,595 | 4/1951 | Gregor | 426/19 |
| 2,767,667 | 10/1956 | Spooner | 426/496 |

FOREIGN PATENT DOCUMENTS 2446581  4/1976  Fed. Rep. of Germany ...... 426/496

*Primary Examiner*—Donald E. Czaja
*Assistant Examiner*—Helen Pratt
*Attorney, Agent, or Firm*—Thomas R. Savoie; Daniel J. Donovan

[57] ABSTRACT

A preproofed, and already partially baked crusty bread which is frozen for later completion of baking and a method of manufacturing the same. When desired to be served, the end user merely takes the product out of the freezer and places the same in the oven for completion of baking. The shelf life of the product is commercially significant whether the product is in the frozen state or thawed and refrigerated or even thawed and retained at room temperature until ready to be baked. After baking is completed, the freshness of the product is retained for up to about 24 hours. A critical aspect of the method of manufacturing the product is a second injection of steam into the oven during partial baking of the product, which provides the end user with a completely sealed crusty bakery product that will not have the crust separate from the loaf. The injection of the steam is a second injection of steam and provides the product with about 20% or greater of moisture than a fully baked and then frozen product.

13 Claims, No Drawings

PREPROOFED, FROZEN AND 84% BAKED, CRUSTY BREAD AND METHOD OF MAKING SAME

BACKGROUND OF THE INVENTION

The present invention relates to a crusty or specialty type bread product and the method of manufacturing the same. A crusty or specialty bread product is exemplified by the traditional French bread, i.e., a bread being rather doughy on the inside, yet light, and having a harder crust on the outside. It is a principal thrust of the invention disclosed herein to provide a specialty or crusty bread to the end user which can be at least in part baked on the end user's premises. This provides the end user with a delicious product which he feels was "baked on the premises" and in addition it provides a sense of the freshly baked aroma of bread. It is a significant advance over merely reheated breads which have already been fully baked and then frozen.

Neighborhood bakeries, supermarket in-store bakeries, and specialty and gourmet shops are seeking to appeal to end users with a fresh baked line of authentic French and other hard crusted breads. The method disclosed herein only requires about 10 to 15 minutes to "finish off" the bread by baking the already partially baked dough in any type of oven, whether it is a domestic oven, a confection oven, a semi-industrial oven, etc., but not however a microwave oven.

Independent of whether the product is placed into the finishing oven in a fully frozen state, a thawed and then refrigerated state or a thawed and stored at room temperature state, upon finishing the baking the result is a spectacular, fresh baked product that retains its freshness for up to about 24 hours and unlike products advertised as "brown and serve" the bread product produced hereby has been fully proofed, cut, steamed and baked to about 84% of the approximate baking time, in ovens where the humidity has been precisely controlled.

DESCRIPTION OF THE PRIOR ART

There exists, of course, in the prior art, fully baked and then frozen breads which are sold in the frozen state to the end user or consumer. When the end user desires to serve this product, he or she removes the same from the freezer and merely reheats it. This however does not provide the end user with a sense of "freshly baking it on the premises" nor does it really provide the same aroma of a freshly baked bread product and further it does not form a crust that will stay on the loaf. Furthermore, this type of product does not have the same freshness as do truly fresh baked bread products.

The invention disclosed herein is intended to provide to the end user a fresh baked authentic French or other hard crusted bread which requires a minimum of time and effort and, yet, provides a delicious, apparently freshly baked product, a sense of accomplishment of baking the same on the premises, the aroma of a fresh baked bread, and a freshness and authenticity which far exceeds currently available totally baked and then frozen-for-later reheating or browning bread products.

Fully baked and then frozen breads which are already commercially avaiable suffer from the following disadvantages, inter alia, with respect to the 84% baked bread product disclosed and claimed herein: The freshness of the finished product, after the completion of baking, is far longer than already fully baked products. There is no separation of the crust from the inside dough, during baking with the first partially baked product and then finished bread disclosed herein. In previously available hard crust products which are meant to be served long after baking, there is a separation between the hard crust and the inside dough. The present invention, on the other hand, exhibits no such bread dough to hard crust separation. When stored at about 0°, the dough has a shelf life of about 5 to 6 months. The shelf-life of the bread, when thawed and stored in a refrigerator is about eight days and the shelf life of the product when thawed and left at about room temperature is about 48 hours. All of these represent improved shelf life with respect to previously available hard crusty or specialty bread.

Also, according to the present invention, the freshness, which usually corresponds to the amount of $CO_2$ and water or humidity retained in the product is also far improved over the previously available products.

SUMARY OF THE INVENTION

The present invention relates to a crusty or specialty bread and a method of manufacturing the same which has an improved shelf life and is to be finished baking on the site of the ultimate end user. The moisture content of the dough product is about 20% greater than the moisture content of a fully baked and then frozen product and this, too, is a tremendous advantage to the present product. Basically, as will be explained more fully hereinafter, the bread is prepared by mixing dry ingredients with water and a leavening agent, preferably, yeast. A taste enhancing ingredient, in the preferred embodiment, salt, is also added. Then the temperature of the ingredients is adjusted so that the temperature of the dough is precisely at about 78° F., after the mixing process is completed. Next, the dough is rested to let the fermentation start. This is done at about an ambient humidity and temperature for about 10 minutes.

Next, the dough is divided, weighed, lightly rounded and then left to rest for a second rising. It is then flattened to expel the oxygen from the compound. The dough is then molded into the dough's final form and then left to rest in the proofing atmosphere for a final rising.

The dough is then proofed and the humidity of the atmosphere is varied, starting at about 75% and ending at about 85%, the temperature being between about 80° to 85° F. thus bringing the dough to a final pre-baked density, showing a volume of about 2 and one-half times the preproofed volume.

Next, the dough is baked. This is done by placing the product in an oven which has been preheated to about 350° to 400° F., according to the size of the loaves. The oven is then injected with a jet of steam in order to contribute to the volume of the bread and accentuate the definition of the slash marks on the top of the loaf. Then the bread is baked to achieve the 84% pre-baked product, whatever amount of time that takes depending on the size and shape of the loaf. Before the completed baking time, however, the over is given a second jet of saturated steam thus allowing the product to retain a substantial amount of moisture, about 20% more than a fully baked product.

The bread is then cooled for a period of about 15 to 30 minutes, depending on loaf size. Then the loaf is flash frozen at about −25° F. for about two to three hours, again, depending on the size of the loaves. Finally, the product is packaged and stored at 0° F.

DETAILED DESCRIPTION OF THE INVENTION AND THE PREFERRED EMBODIMENT

The purpose of the method of the invention disclosed herein is to enable neighborhood bakeries, supermarket in-store bakeries, and specialty and gourmet shops to offer the end user or consumer a fresh baked line of authentic French and other hard crusted breads. The purpose of the present invention is accomplished while maintaining terrific freshness and authenticity of the product before final baking and after the final baking is finished. The method only requires about 10 to 15 minutes to "finish off" the bread by baking the partially baked dough in any type of commercial or even residential oven, as, for example, confection, semi-industrial, domestic, etc. (not a microwave, however). Also of importance, the present invention does not require the use of specially skilled labor to provide the desired product. At a temperature of about 350° to 375° Fahrenheit, the processed and partially baked dough may be baked to a finished product either from a frozen or a thawed state. Irrespective of the state that the dough product is in when the dough is sought to be "finished off", the result is a spectacular, fresh baked product that retains its freshness for up to 24 hours. Unlike products advertised as "brown and serve", the bread product produced herein has been fully proofed under controlled conditions, has been cut, steamed and precisely pre-baked to only about 84% of a finished baked product in properly humidity controlled steam providing ovens. In this manner, the ultimate finisher of the product is doing the baking to a finished edible product and the freshness is superior. The presence of the freshly baked aroma is also significant.

A commercial batch of the product is prepared with 100 pounds of flour consting the base. The particular composition of the preferred embodiment of the flour is 80 pounds of 12.5% protein flour, representing an 80% base flour, 19 pounds of 10.0% protein flour, representing 19% stabilizer and 1 pound of 18.0% protein gluten, representing 1% high protein supplement. The percentages just described add up to a total of 100% or 100 pounds of the flour composition. As is usual in commercial baking, the other ingredients are based on percentages of the total flour which percentages are easily converted into pounds. The flour is first dry mixed to form the flour composition. Then 57 pounds or 57% water as the hydration agent, is added to the dry mixture along with 2 and one-half pounds of yeast representing 2 and one-half percent leavening agent and 2 pounds of salt, representing the 2% taste or flavor enhancer.

The dry ingredients, except the salt, along with the water are mixed in a conventional manner to produce a homogenous dough composition. Mixing takes about 14 minutes. Then salt is added for the last 4 minutes of mixing. The temperature of the ingredients, along with a consideration of the ambient temperature, is adjusted so that the dough composition, after mixing, is at a temperature of precisely about 78° F.

Now, the dough must rest for about 10 minutes in order to allow the fermentation to commence and this is done in an ambient atmosphere of about 80° to 85° F.

Once the dough has risen for the first time it is then divided, weighed, lightly rounded, and then left to rest for a second rising for a period of time varying from between about 12 to 18 minutes. It is then flattened to expel the oxygen from the compound, molded into the dough's final form and then left to rest in the proofing atmosphere for the final rising until it reaches the perfect density. The variations of humidity percent contribute to avoid any rupture on the dough's surface or "skin".

In the proofing stage, the humidity is variated, between about 75% and about 85%. This brings the dough to a final pre-baked density, showing a volume of about 2 and one-half times the preproofed volume.

The dough is now ready for near complete baking. The dough is placed in a preheated oven at a temperature of about 350° to 400° Fahrenheit according to the size of the loaves. During baking, the oven is injected with a jet of steam in order to contribute to the volume of the bread and, in addition, in order to accentuate the definition of the slash marks on the top of the loaf. It is baked for whatever time is necessary to achieve an 84% pre-baked product again, depending on size and shape.

Before, however, the completed baking time is reached, the oven is given a second jet of saturated steam, thus allowing the product to retain a substantial amount of moisture, in the order of about 20% more than a fully baked product, i.e., 20% more humidity than present in a 100% baked and finished product and/or a brown and serve type product.

The bread loaves are then cooled for a period of about 15 to 30 minutes, depending on the loaf size. The partially baked loaves do not contain any more $CO_2$ thus allowing the long shelf life and high quality finished product. The loaves are then flash frozen at about $-25°$ F. for about two to three hours, again, depending on size.

Finally, the product is packaged in a plastic wrapper for final storage at about 0° F.

One of the truly unique aspects of the processing is the last injection of steam before the 84% pre-baked finality is achieved. This enables the end-user to have a product with a completely sealed crust that will not separate from the loaf. That undesirable separation can be observed in many of the so-called "brown and serve" products.

It will be appreciated that the particular description of the embodiments disclosed herein are representative only of the invention and the true scope to which I am entitled to is shown by the claims and their legal equivalents.

I claim:

1. A method of producing a frozen, partially-baked, fully-proofed, crusty bread product comprising the steps of:
   (a) mixing dry ingredients comprising flour and yeast with water to form a dough;
   (b) allowing said dough to rise;
   (c) fully proofing said dough in a high humidity atmosphere;
   (d) placing said dough in a preheated oven for baking;
   (e) injecting said oven, during baking, with a first amount of steam; thereafter,
   (f) continuing to bake the dough; thereafter,
   (g) injecting said oven with a second amount of steam, said second amount of steam enabling the partially-baked bread product of step (h) to possess at least 20% more moisture than present in a 100% baked bread product; and thereafter,
   (h) removing said dough from said oven after only about 84% of the final baking is accomplished;

(i) cooling the partially-baked product of step (h); and then, (j) flash freezing the cooled product of step (i).

2. A method as claimed in claim 1, wherein the temperature of said dry ingredients and water are adjusted such that said dough, after mixing, is at a temperature of about 78° F.

3. A method as claimed in claim 1, wherein said proofing provides a volume of said dough about 2 and one-half times the volume of said dough before proofing.

4. A method as claimed in claim 1, wherein said proofing is at about a 75% to 85% humdity atmosphere.

5. A method as claimed in claim 1 wherein said freezing is done at about −25° F. for about 2 to 3 hours.

6. A method as claimed in claim 1, wherein said flour comprises about 80% base of a 12.5% protein flour; 19% stabilizer of a 10.0% protein flour; and 1% high protein supplement of an 18.0% protein gluten.

7. A method as claimed in claim 1, wherein said water is about 57%, by weight, of said flour.

8. A method as claimed in claim 1, wherein said yeast is about 2 and one-half percent, by weight, of said flour.

9. A method as claimed in claim 1, wherein said dry ingredients further comprise about 2%, by weight, of salt.

10. A method as claimed in claim 1, wherein said dry ingredients are mixed for about 14 minutes.

11. A method as claimed in claim 9, wherein said salt is added after said water and mixed for about 4 minutes.

12. A partially baked, fully proofed bakery product made according to the method of claim 1.

13. The method of claim 1 wherein the dough is baked at from 350° to 400° F.

* * * * *